United States Patent [19]

Eriksson

[11] 4,185,432

[45] Jan. 29, 1980

[54] ELEMENTS FOR SUPPORTING AND BRACING SEALED-GLAZING UNITS

[76] Inventor: Lars Eriksson, Storgatan 10, S-361 00 Emmaboda, Sweden

[21] Appl. No.: 867,366

[22] Filed: Jan. 6, 1978

[30] Foreign Application Priority Data

Jan. 21, 1977 [SE] Sweden ............................... 7700609

[51] Int. Cl.[2] ............................ E06B 7/16; B23P 7/00

[52] U.S. Cl. ........................................ 52/400; 49/482; 52/403; 52/788

[58] Field of Search .................................. 52/670–672, 52/635, 674, 675, 308, 616, 623, 628, 108, 400, 403, 788; 428/131, 132, 134, 136; 264/328; 49/482; 29/163.5

[56] References Cited

U.S. PATENT DOCUMENTS

| | | | |
|---|---|---|---|
| 2,052,024 | 8/1936 | Hahn | 52/670 |
| 2,492,909 | 12/1949 | Warp | 52/675 |
| 2,584,916 | 2/1952 | Poux | 264/328 |
| 2,643,863 | 6/1953 | Buschow | 29/163.5 R |
| 3,165,810 | 1/1965 | Agler | 29/163.5 R |
| 3,438,112 | 4/1968 | Labruyere | 52/400 |

*Primary Examiner*—James L. Ridgill, Jr.

*Attorney, Agent, or Firm*—Kenway & Jenney

[57] ABSTRACT

A support for a sealed glazing unit to lie in a channel for that unit consists of two longitudinal edge ribs connected by a resilient hinge-forming body so that the width of the support is adjustable by moving the ribs parallel to each other. The support will be held in a channel that is narrower than the support in its relaxed state. In one form it may have outside abutment faces so that it can be expanded and grip the edge of the glazing unit.

7 Claims, 10 Drawing Figures

Fig. 8
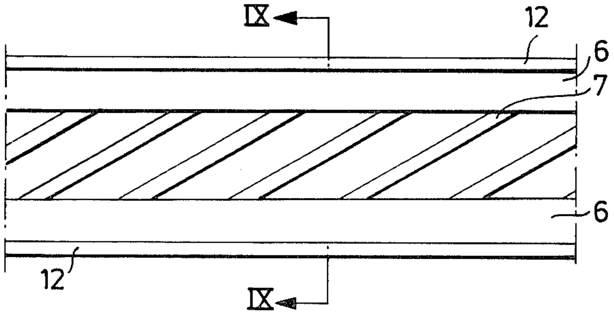
Fig. 9
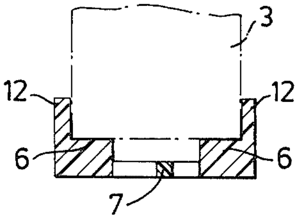
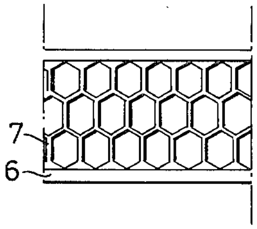
Fig. 10

ELEMENTS FOR SUPPORTING AND BRACING SEALED-GLAZING UNITS

The present invention relates to elements for supporting and bracing sealed-glazing units or similar plate-like bodies in or surrounding frame, or for supporting such units or bodies in a storage frame or the like. Although the invention is hereinafter described with reference to sealed-glazing units, it will be understood that the invention can also be applied with other plate-like bodies.

Sealed glazing units, by which is meant units comprising two or more panes of glass sealingly mounted on an intermediate frame in a manner to form an hermetically sealed space between adjacent panes, are today available in varying forms and sizes, ranging from about 25 mm to about 45 mm in thickness.

When mounting such sealed glazing units in a casement or window frame, spacers—normally called blocks—are placed in the space between the side edges of a unit and the rebated bottom rail of the casement or frame, thereby to support the unit and, in the case of side-hung windows, to stay the unit laterally.

The purpose of the blocks is to distribute the pressure forces acting between the unit and the casement or frame in a manner so controlled that the panes of glass in the unit take up substantially equal pressure forces.

In order to fulfill this purpose, the blocks must have a width which is greater or equal to the thickness of the sealed glazing unit with which they are used, but smaller than the width of the said rebated rail, and hence these blocks must be manufactured in a large assortment of sizes, to suit practically all conceivable widths of sealed glazing units.

Thus, considering the wide variation in the widths of present day sealed glazing units, this means that a large number of different types of blocks must be stored, and handled when installing windows. Storage on such a large seale is expensive to administer, and there is a grave risk of the wrong block being used, when installing a window.

An object of the present invention is to provide a universal block which can be adapted to different width measurements, thereby enabling said block to be used reliably for the installation of sealed glazing units of varying thicknesses or widths.

Accordingly this invention consists in an element that comprises two longitudinally extending edge ribs and an elongate body arranged between said ribs and connected thereto in a manner such as to permit said ribs to be moved towards and away from each other, thereby to enable the width of said element to be adapted to the width of said edge.

Figure 1:
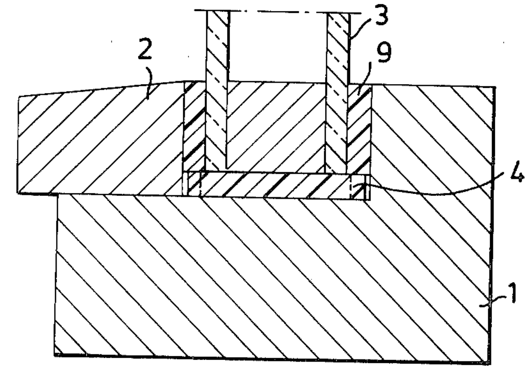
Figure 2:
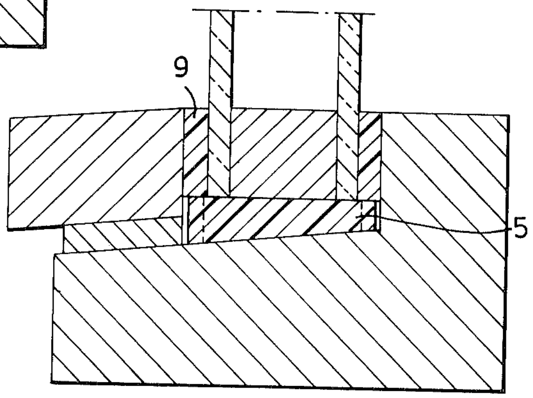
Figure 3:
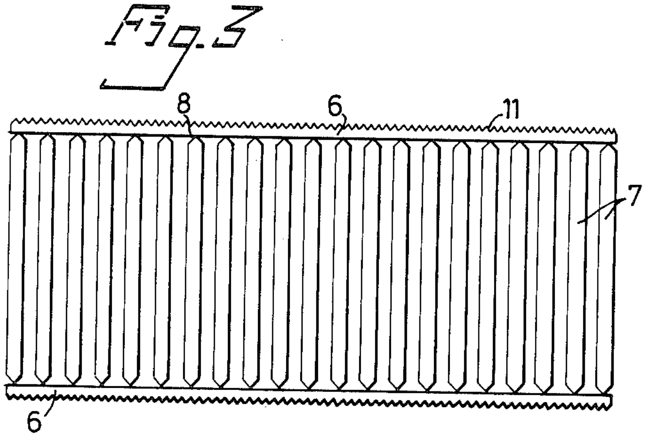
Figure 4:
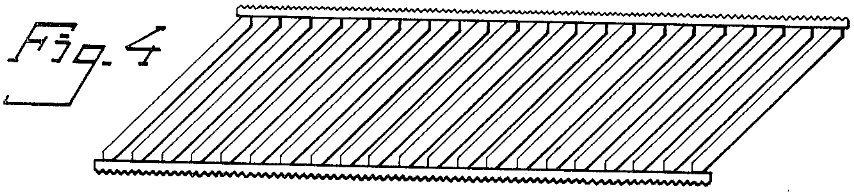
Figure 5:
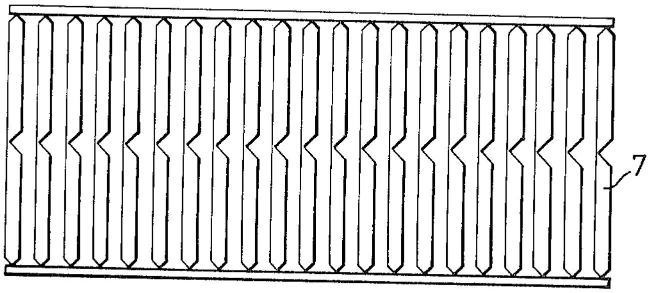
Figure 6:
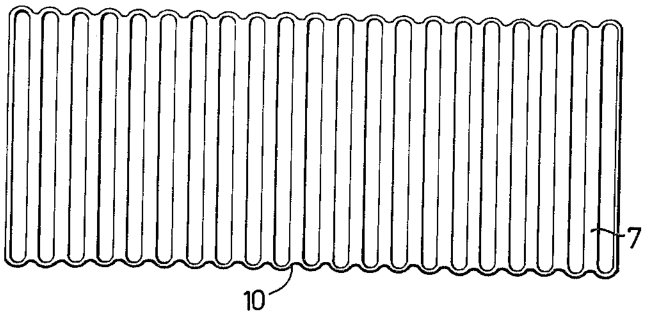
Figure 7:
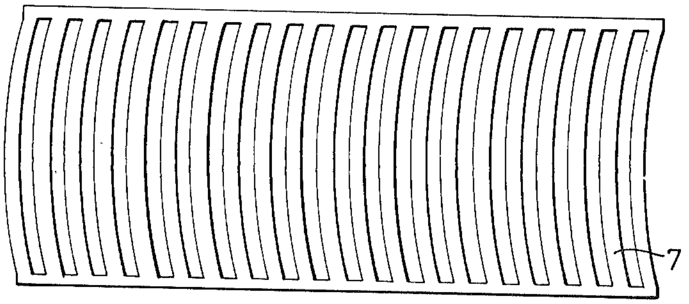

So that the invention will be more readily understood and further features thereby made apparent, an exemplary embodiment of the invention will now be described with reference to the accompanying schematic drawings, in which FIG. 1 is a cross-sectional view of a casement having a straight rebate at a section in which a sealed glazing unit is supported by a block, FIG. 2 is a cross-sectional view of a casement having an inclined rebate, FIG. 3 illustrates a preferred embodiment of the block according to the invention, FIG. 4 illustrates the block of FIG. 3 in a compressed state, FIG. 5 illustrates an alternative embodiment of the block, FIG. 6 illustrates a second alternative embodiment of the block, FIG. 7 illustrates a third alternative embodiment of the block, FIG. 8 illustrates a fourth embodiment of the block, FIG. 9 is a sectional view taken on the line IX—IX in FIG. 8, and FIG. 10 illustrates a further embodiment.

In FIG. 1 there is illustrated a casement or window frame comprising a frame bar 1 and a glazing bar 2 which define therebetween a channel in which is arranged a sealed glazing unit 3, in the illustrated embodiment a double-glazing unit. The unit 3 is supported at at least two locations along its underside by respective blocks of the aforementioned type having a rectangular cross-sectional shape. The unit 4 is sealed against opposing surfaces of the frame bar 1 and the glazing bar 2 by means of a sealing or jointing compound or by means of a sealing joint 9 made by an elastomeric material.

In certain cases, the casement or window frame has a sloping bottom rail, to enable moisture collecting thereon to drain away more readily. Such a casement is shown in FIG. 2. With such a casement there are used blocks 5 of wedge-shaped cross-section, thereby to provide a horizontal surface on which to place the sealed glazing unit.

In FIGS. 3 and 4 there is illustrated a preferred embodiment of a supporting and bracing block, said block comprising two edge ribs 6 whose outer edges may be notched or serrated, as shown at 11, to enhance the grip of said block against respective surfaces of the channel receiving the unit. The edge ribs are connected together by a plurality of mutually spaced apart transverse ribs 7 of rectangular cross-section. The edge ribs and transverse ribs are joined together via weakened portions which are readily bendable, said portions having been produced by chanfering the transverse ribs as shown at 8 in a manner such that the thickness of the ribs is reduced at each connecting point in the longitudinal direction of the block.

The block is extended from a synthetic resin material, such as polyethylene, in a manner such as to impart to the connections of the transverse ribs to the edge ribs the function of a resilient hinge, so that should the block be compressed in the manner illustrated in FIG. 4, it will attempt to return to its original width.

As will be understood from the aforegoing, it is possible to manufacture a block according to the invention whose greatest width is slightly larger than the largest sealed glazing unit available today, about 45 mm, and, by compressing the block laterally, to adapt the width of the block to the width of the unit being installed in the case of units whose widths are less than about 45 mm and preferably not greather than 25 mm, although narrower units can be envisaged.

Because of the elasticity of the block, it will press against the sides of the channel in a manner such that it is unable to slide along the channel with the unit installed, a fault which is inherent with present day blocks. With present day blocks it is some times necessary to glue them to the casement or frame, which adds to the expense of installing a unit.

When the blocks are to be used with windows or frames having an oblique rebate or channel, the blocks may have the cross-sectional shape of the block 5 in FIG. 2, as have the blocks used today.

Further embodiments of the block according to the invention are shown in FIGS. 5, 6 and 7.

Thus, as shown in FIG. 5, each of the transverse ribs may be provided with a notch, so that when the block is compressed the ribs become V-shaped. In this embodiment, the edge ribs may be pressed directly towards each other instead of being displaced in the longitudinal direction of the block, as in the FIG. 4 embodiment.

FIG. 6 illustrates a block in which the edge ribs have the form of readily bendable arcuate portions 10 which extend between respective pairs of mutually adjacent transverse ribs. In this embodiment, the edge ribs form a unit with the readily bendable portions of the FIG. 2 embodiment.

FIG. 7 illustrates a block in which the transverse ribs are readily bendable over the whole of their lengths and are also slightly curved. When the block is compressed the curvature of the transverse ribs, which are fixed to the edge ribs, is enlarged. It will be understood that further modifications are conceivable without departing from the concept of the invention as set forth in the accompanying claims. For example, the width of the block as extruded may be narrower than the narrowest of the units available, and the block may be provided on the edge ribs with flanges or pins by which the block can be extended and clamped around the edge or edges by a sealed glazing unit prior to installing the unit in the casement or frame.

One such embodiment is illustrated in FIGS. 8 and 9. As will be seen in FIG. 8, the transverse ribs 7 are joined to the edge ribs in a manner such as respectively to form an angle of less than 90° therewith, e.g. an angle of 30° when no load is placed on the block. Obviously, this angle can be varied. In addition to making it easier to compress the block, the block according to FIGS. 8 and 9 may be so designed that the perpendicular distance between the edge ribs is less than the thickness of the sealed glazing unit, or of said other plate-like body, to be supported and/or propped at the edges thereof by said blocks. When the blocks are to be mounted, the two edge ribs 6 are moved away from each other and an edge of the unit, or plate-like body, is inserted between the flanges 12 upstanding from said edge ribs 6. When the edge ribs are released, they will be drawn towards each other as a result of the elasticity of the transverse ribs 7, whereupon the flanges 12 will grip around the said surfaces of the body 3, shown in FIG. 9 in dash lines. The blocks, which are injection moulded as one piece structures from, for example, a plastics materials of good elasticity, are reliably held against the edge of said body, thereby allowing said edge to be rested against the ground without fear of damage. The flanges can be replaced by pins extending from the edge ribs 6 in a manner to embrace an edge of the body or unit 3. In the embodiment illustrated in FIGS. 8 and 9, the ribs 7 are not as high or thick as the edge ribs 12, and therefore it is these ribs which will bear against said edge of the body or unit 3. It will be understood, however, that the transverse ribs of this embodiment, and indeed also of the other embodiments, may have a height such that they bear against said edge. According to one suitable embodiment of a block having upstanding flanges on the edge ribs for abutment with the sides of said body or unit, the flanges may comprise the aforementioned edge ribs of greater height than their associated transverse ribs, such that the side edges of said body or unit are firmly held against the inwardly facing surfaces of said edge ribs.

It will be understood that the edge ribs of the embodiments first described may also be provided with upstanding flanges or pins for abutment with the side surfaces of said body or unit.

Conveniently, the transverse ribs extending between the edge ribs, e.g. edge ribs 6, may be replaced by a compressable portion having the form of an elastic plate of honeycomb structure with open cells or the like (FIG. 10) such as to permit the requisite movement of the edge ribs towards and away from each other. The elongate body joining the edge ribs may also have a grid-like structure with, for example, rectangular openings which permit axial displacement of the edge ribs relative to each other and therewith also towards each other, in the manner illustrated in FIG. 4.

I claim:

1. A supporting and bracing element adapted to engage an edge of a plate-like means received by glazing means, said element comprising:

two longitudinally extending edge ribs; and resilient, elastic body means arranged between said edge ribs and connected thereto in a manner such as to enable the distance between said edge ribs to be varied;

said body means comprising a plurality of web means operable to be resiliently and elastically deformed and elastically change said distance between said edge ribs; and said body means being operable to be resiliently and elastically distorted, transversely of said edge ribs, with said body means thereafter resiliently and elastically tending to restore itself toward its original configuration due to its own resilience and elasticity and resiliently grip opposite sides of one of said glazing means and said plate-like means.

2. An element according to claim 1, in that wherein:

said web means of said resilient, elastic body means define a generally honeycomb structure with open cells.

3. An element according to claim 1 wherein:

each of said edge ribs, has extending therefrom abutment means operable to resiliently engage opposite sides of said plate-like means.

4. An element according to claim 1, wherein:

said elongated body means comprises elastically distortable transverse ribs comprising said web means and extending transversally between said edge ribs.

5. An element according to claim 4 wherein:

said transverse ribs have elastically distortable portions.

6. An element according to claim 4 wherein:

said element is injection moulded as a unitary one piece structure from a plastically deformable elastic material; and said transverse ribs form an angle with said edge ribs; and said element when compressed and then released, tends to elastically urge said transverse ribs away from each other.

7. An element according to claim 4 wherein:

said transverse ribs include relatively stiff central portions; and relatively flexible end portions forming resilient hinges between said transverse ribs and said edge ribs.

* * * * *